United States Patent

Kirschbaum et al.

[11] Patent Number: 5,814,141
[45] Date of Patent: Sep. 29, 1998

[54] LIQUID CRYSTALLINE CELLULOSE (ETHER) ETHERS AS INTERFERENTIALLY EFFECTIVE CHROMOPHORIC SUBSTANCES

[75] Inventors: Martin Kirschbaum; Maria-Theresia Sailer, both of Ulm; Fritz Dannenhauer, Hasel; Hartmut Seliger, Elchingen, all of Germany

[73] Assignee: Daimler-Benz AG, Stuttgart, Germany

[21] Appl. No.: 757,236

[22] Filed: Nov. 27, 1996

[30] Foreign Application Priority Data

Nov. 27, 1995 [DE] Germany ............ 195 44 091.9

[51] Int. Cl.$^6$ .............................................. C09D 105/00
[52] U.S. Cl. ................... 106/162.82; 106/172.1; 106/193.1; 106/493; 106/498; 106/499; 106/500; 106/505; 106/506; 106/501.1; 252/299.6; 252/299.61; 252/299.63; 528/502; 536/84; 536/90; 536/91; 536/93
[58] Field of Search ................... 106/493, 498, 106/499, 500, 505, 506, 501.1, 162.82, 172.1, 193.1; 252/299.6, 299.61, 299.63; 528/502; 536/84, 90, 91, 93

[56] References Cited

U.S. PATENT DOCUMENTS

| | | | |
|---|---|---|---|
| 2,080,797 | 6/1937 | Hahn | 536/93 |
| 2,232,927 | 2/1941 | Peterson et al. | 536/93 |
| 2,336,985 | 12/1943 | Freund | 526/238.21 |
| 2,414,144 | 1/1947 | Ernsberger | 536/92 |
| 2,415,041 | 1/1947 | Rust | 106/198.1 |
| 2,455,083 | 11/1948 | Musser | 536/93 |
| 2,682,481 | 6/1954 | Hewson | 427/336 |
| 2,891,056 | 6/1959 | Wagner | 106/172.1 |
| 3,251,825 | 5/1966 | Haidasch et al. | 536/91 |
| 5,166,332 | 11/1992 | Breckwoldt | 536/84 |
| 5,294,702 | 3/1994 | Breckwoldt et al. | 536/84 |
| 5,362,315 | 8/1994 | Müller-Rees et al. | 106/493 |

FOREIGN PATENT DOCUMENTS

| | | |
|---|---|---|
| 0 383 376 | 8/1990 | European Pat. Off. . |
| 42 40 743 | 6/1994 | Germany . |
| 43 07 769 | 9/1994 | Germany . |
| 44 18 076 | 11/1995 | Germany . |
| 62 039 686 | 2/1987 | Japan . |

OTHER PUBLICATIONS

Yamagishi, T. et al., "Thermotropic Cellulose Derivatives with Flexible Substituents. I. Prepareation of Tri–o–($\mu$–methoxyethoxy) ethyl Cellulose and its Cholesteric Mesophases Properties", Molecular Crystals and Liquicd Crystals, vol. 172, Jul. 1989, pp. 17–25.

Primary Examiner—Mark L. Bell
Assistant Examiner—Scott L. Hertzog
Attorney, Agent, or Firm—Evenson, McKeown, Edwards & Lenahan P.L.L.C.

[57] ABSTRACT

The invention relates to a liquid crystalline, photo crosslinkable main-chain polymer used as interferentially effective, chromophoric substance for colored paints, in which the main mesogenic groups are disposed at least approximately in a chiral-nematic manner. An etherified cellulose ether or a mixture of several etherified cellulose ethers is used pursuant to the invention as liquid crystalline main-chain polymer or polymers wherein:

the cellulose ethers have a molecular weight of 500 to 1,000,000, the anhydroglucose units of the cellulose ethers are etherified with an average degree of molar substitution of 2 to 7 with propylene oxide or ethylene oxide units ($C_3H_6O$- or $C_2H_4O$-units), and the cellulose ethers are etherified with an average degree of molar substitution of 1.5 to 3 with unsaturated hydrocarbon groups ($C_rH_{2r-1}$).

29 Claims, 3 Drawing Sheets

LIQUID CRYSTALLINE CELLULOSE (ETHER) ETHERS AS INTERFERENTIALLY EFFECTIVE CHROMOPHORIC SUBSTANCES

BACKGROUND AND SUMMARY OF THE INVENTION

The present invention relates to liquid crystalline, photo cross-linkable main-chain polymers which are interferentially effective, chromophoric substances for colored paints, comprising main mesogenic groups disposed at least approximately in a chiral-nematic manner, to interference pigments or interferential, color-effective, paint substances of liquid crystalline, cross-linked, main-chain polymers for colored paints, comprising main mesogenic groups disposed at least approximately in a chiral-nematic manner, as well as to a method of producing platelet-shaped interference pigments.

So-called effect paints have been developed in an effort to produce paints which are more brilliant. EP 383 376 A1 describes an effect paint, the color of which changes depending on the viewing angle, in which small platelets are coated uniformly all around with a cross-linked, liquid crystalline polymer (LCP) in a chiral-nematic arrangement. The color appearance of such pigments is due to an interference phenomena. Only those wavelengths of incident light which interfere with the equidistant lattice plane distances of the liquid crystalline polymers are reflected, whereas the other wavelengths of light pass through the transparent paint substance and are absorbed by the preferably dark core of the interference pigment, namely, the platelet or by the dark substrate of the effect paint. Such platelet-like interference pigments, which are aligned parallel to the surface that is to be painted, have a specific first color or basic color when viewed orthogonally and a second shorter wavelength color when viewed at an angle. This apparent color change of the paint depending on the viewing angle, makes the paint finish very striking and, for some applications, such color effects are very desirable. However, the expensive manufacturing process of such multi-layered interference pigments, which results in the effect paint and the effect finish being quite expensive, is a disadvantage.

U.S. Pat. No. 5,362,315 (counterpart of Published German Patent DE 42 40 743 A1) discloses the manufacture of interference pigments based on polysiloxanes, which consist of small fragments of a thin, cross-linked film of liquid crystalline polymers. These interference pigments are colorless, transparent and clear. The color effect achieved with them is based on the regular structure and the uniform arrangement of the molecules in the form of a liquid crystal and on interference of a particular spectral portion of light, which is reflected by the pigment. The light at other wavelengths passes through the pigment. As a result, astonishing color effects of different types can be achieved, depending on the arrangement of the paint finish or of the interference pigments and their mixture. Polysiloxanes, which are used as liquid crystalline polymers, have the disadvantage that they must be synthesized in several steps and from expensive starting materials. Interference pigments of this type are produced by applying liquid or liquid crystalline polymers on a smooth substrate, such as a polished roller, with a doctor blade as a result of which a thin film is formed. Due to the action of the doctor blade, the molecules align themselves in the film in a homogeneous orientation. Only after this alignment does the film exhibit an interference color. As a result of the action of the doctor blade, equidistant lattice spacing and refractive structures with a color-selective effect form automatically during the shearing process of the liquid crystalline polymers.

DE 43 07 769 A1 discloses a method for producing a coating with good nonlinear optical properties on microelectronic substrates (optical switches, frequency doublers), in which a liquid crystalline polymer is simultaneously subjected to an electrical field and a specific action of light below its glass transition temperature. The frequency-doubling property of the polymer, caused by the action of light and the electric field, is stably maintained for days after treatment of the liquid crystalline polymers, even after the electric field and light are switched off. Aside from the preferred cyclic polysiloxanes with cholesteric properties, polymethacrylates, polyacrylates, polyvinyl compounds, polyethers and polyesters are also disclosed as possible starting materials. However, this reference, which deals with microelectronics and fiber optics, does not provide workers in the art of paint and pigment chemistry with any teaching of a way to devise new interferential effect paints.

One condition required for the occurrence of liquid crystalline (LC) phases, is a rigid, mesogenic, molecular configuration. The repeating units of liquid crystalline polymers contain the mesogenic units. Two molecular structures most frequently realized, are the side chain LC polymers, in which the mesogenic units are chemically fixed as side chains of the polymer backbone, and the main-chain LC polymers, in which the mesogenic units form the polymer backbone or a portion of the polymer backbone. Aside from homopolymers, a plurality of copolymers can be synthesized, which can contain different mesogenic units.

In German Patent Application P 44 18 076.4-13 (CA 2,190,879; U.S. application Ser. No. 737,620) of the applicant, an esterified cellulose ether or a mixture of different polymers of this type was disclosed as a liquid crystalline, main-chain polymer. The reason for the selection of this material was that the material basis of these polymers is easily available and attractively priced. The application discloses forming a thin film by applying liquid crystalline polymers on a smooth substrate. Thereafter, the polymer film is cross-linked and the film is removed and comminuted into interference pigments. The interference pigments are then mixed into a resin as the paint substance. However, cross-linked esterified cellulose ethers are not sufficiently chemically stable when subjected to the prolonged action of aggressive media, such as alkalis or acids.

It is an object of the present invention to provide a liquid crystalline polymer which is attractively priced and wherein the base materials are easily available, but which has better chemical stability compared to cellulose (ether) esters.

Pursuant to the present invention this object is accomplished by a polymer wherein the polymer is an etherified cellulose (ether) or a mixture of several etherified cellulose (ethers) with the following distinguishing features:

the cellulose ethers used have a molecular weight of 500 to 1,000,000, the cellulose ethers comprise anhydroglucose units which are etherified with an average degree of molar substitution of 2 to 7 with propylene oxide or ethylene oxide units ($C_3H_6O$- or $C_2H_4O$-units), and the cellulose ethers are etherified with an average degree of molar substitution of 1.5 to 3 with unsaturated hydrocarbon groups ($C_rH_{2r-1}$).

In contrast to the cross-linkable cellulose (ether) esters of the previous German application, cross-linkable cellulose (ether) ethers are used pursuant to the present invention.

Whereas the cellulose (ether) esters disclosed in the previous German application are obtained by esterification of commercially available cellulose ethers, such as O-hydroxypropyl cellulose or O-hydroxyethyl cellulose, the cellulose (ether) ethers of the present invention are obtained by etherification of the same cellulose ethers. The advantage of the present invention over the older cellulose (ether) esters of the previous German application lies in that the different chemical structure of ether bonds leads to chemical stability which is better than that of the cellulose (ether) esters.

These and other objects, features and advantages of the present invention will become more readily apparent from the following detailed description when taken in conjunction with the accompanying drawings.

BRIEF DESCRIPTION OF THE DRAWINGS

The drawings show the different structural formulas of the starting materials, the intermediates and the liquid crystalline polymers, wherein.

DETAILED DESCRIPTION OF THE DRAWINGS

Figure 1:
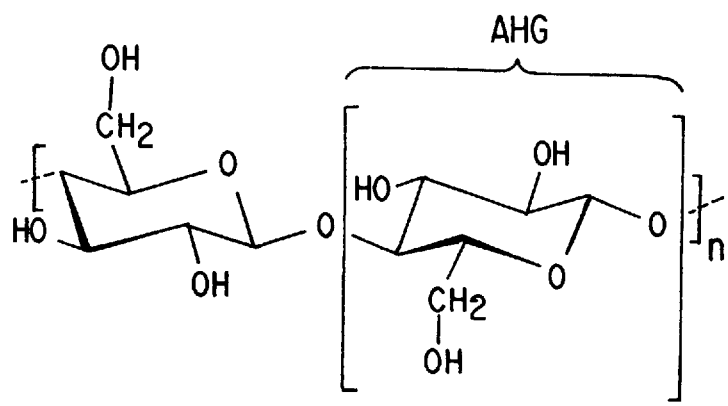
FIG. 1 shows the molecular structure of cellulose with an anhydroglycose group (AHG)

The polymer used according to the present invention, consists of anhydroglucose units (AHG units as seen in FIG. 1), which have not more than three side chains which consist of hydroxypropyl or hydroxyethyl groups linked through the OH groups. The lengths of the side chains do not need to be uniform. Furthermore, different hydroxypropyl or hydroxyethyl groups may be present. For the purposes of the present invention, the degree of etherification n, a statistical quantity, which is preferably between 2 and 7, is important. The starting polymer is reacted with unsaturated alkenyl bromides. This is also a statistical reaction wherein some of the OH groups of the hydroxypropyl or hydroxyethyl groups are not reacted. For the purposes of the present invention, the magnitude of the degree of etherification q is also important and is preferably between about 1.5 and 3.

The cellulose ether may preferably be an educt containing 2 to 15 carbon atoms in side chains. Additionally, the cellulose ethers may preferably be additionally etherified with unsaturated alkenyl groups.

According to a preferred embodiment, the cellulose (ether) ether may be propylene oxide educt units ($C_3H_6O$-units), wherein hydroxypropyl cellulose of the following general formula

$(AHG\ (C_3H_6O)_nH_3)_m$ is etherified to a product of the following general formula

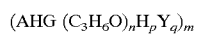
$(AHG\ (C_3H_6O)_nH_pY_q)_m$ wherein AHG=anhydroglucose unit, $Y=C_rH_{2r-1}$, n=2 to 7, m=5 to 2500, p=3−q, q=1 to 3 and r=2 to 15.

According to another preferred embodiment, the cellulose (ether) ether may be ethylene oxide educt units ($C_2H_4O$-units), wherein hydroxyethyl cellulose of the following general formula

$(AHG\ (C_2H_4O)_nH_3)_m$ is etherified to a product of the following general formula

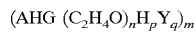
$(AHG\ (C_2H_4O)_nH_pY_q)_m$ wherein AHG=anhydroglucose unit, $Y=C_rH_{2r-1}$, n=2 to 7, m=5 to 2500, p=3−q, q=1 to 3 and r=2 to 15.

The inventive cellulose (ether) ethers may be used as interference pigments for producing paints for painting products with an optically demanding appearance, such as automobiles. The present invention also relates to a method for producing such interference pigments. The present invention also claims paints produced with such inventive interference pigments and the paint coating as applied to objects. In this regard, it is noted that in a preferred embodiment, aside from the interference pigments, absorption pigments without a color flop may also be mixed into the paint. This may be appropriate for producing particular colors when the color of the absorption pigment differs from one of the two interferentially produced colors of the interference pigments. Alternatively, the brilliance of one of the two interference colors can be intensified by admixing absorption pigments of the same color as the interference color in question.

It is also possible to use the inventive polymers in liquid form as a paint substance of a paint, wherein the interferential color effect is achieved by the paint substance itself, which is chromophoric because of the fact that the main mesogenic groups of the liquid crystalline polymers are disposed at least approximately in a chiral-nematic manner by the paint application. For this type of use, the liquid crystalline polymer must be cross-linked after the paint is applied on the painted object. The present invention also relates to paints produced with the inventive, liquid crystalline polymers and to coatings applied to objects. According to a preferred embodiment, pigments of the same or different color and interference pigments and/or absorption pigments are mixed into the paint which is to be used. The same considerations mentioned above with respect to interference pigment paints, apply here.

According to the present invention, the interference pigment or interferential, color-effective, paint substance of liquid crystalline, cross-linked, main-chain polymers for colored paints, comprise main mesogenic groups disposed at least approximately in a chiral-nematic manner, wherein the polymer is an etherified cellulose ether or a mixture of several etherified cellulose ethers with the following distinguishing features:

the cellulose ethers have a molecular weight of 500 to 1,000,000, the cellulose ethers comprise anhydroglucose units which are etherified with an average degree of molar substitution of 2 to 7 with propylene oxide or ethylene oxide units ($C_3H_6O$- or $C_2H_4O$-units), the cellulose ethers are etherified with an average molar degree of substitution of 1.5 to 3 with unsaturated hydrocarbon groups ($C_rH_{2r-1}$).

These interference pigments preferably have a thickness of 5 to 50 µm and a diameter of 5 to 100 µm.

The method of producing platelet-shaped interference pigments according to the present invention comprises producing a film with an approximately chiral-nematic disposition of molecules by applying liquid crystalline main-chain polymers (LCP) in the liquid state on a smooth substrate, and curing the film, pulling the film from the substrate and comminuting the film into platelet-shaped particles, sorting out the particles which are too large or too small by a separation method based on size, wherein the film is produced from a liquid crystalline etherified cellulose ether or a mixture of different etherified cellulose ethers with the following distinguishing features:

the cellulose ethers have a molecular weight of 500 to 1,000,000, the cellulose ethers comprise anhydroglucose units which are etherified with an average degree of molar substitution of 2 to 7 with propylene oxide or ethylene oxide units ($C_3H_6O$- or $C_2H_4O$-units), the cellulose ethers are etherified with an average molar degree of substitution of 1.5 to 3 with unsaturated hydrocarbon groups ($C_rH_{2r-1}$).

In a preferred embodiment, the chiral-nematic arrangement of the molecules in the film have a helix pitch and an the interlattice plane distance in the un-cross-linked state which can be influenced by tempering the film in a manner such that the interlattice plane distance corresponds to the wavelength of the desired interference color.

In a further preferred embodiment, the film is tempered in the un-cross-linked state by heating at a constant temperature ranging from 120° C. to 160° C. for a period of 5 to 30 minutes, preferably 15 minutes, and subsequently cross-linking the liquid crystalline polymer forming the film out of the heat treatment by UV radiation.

Figure 4:
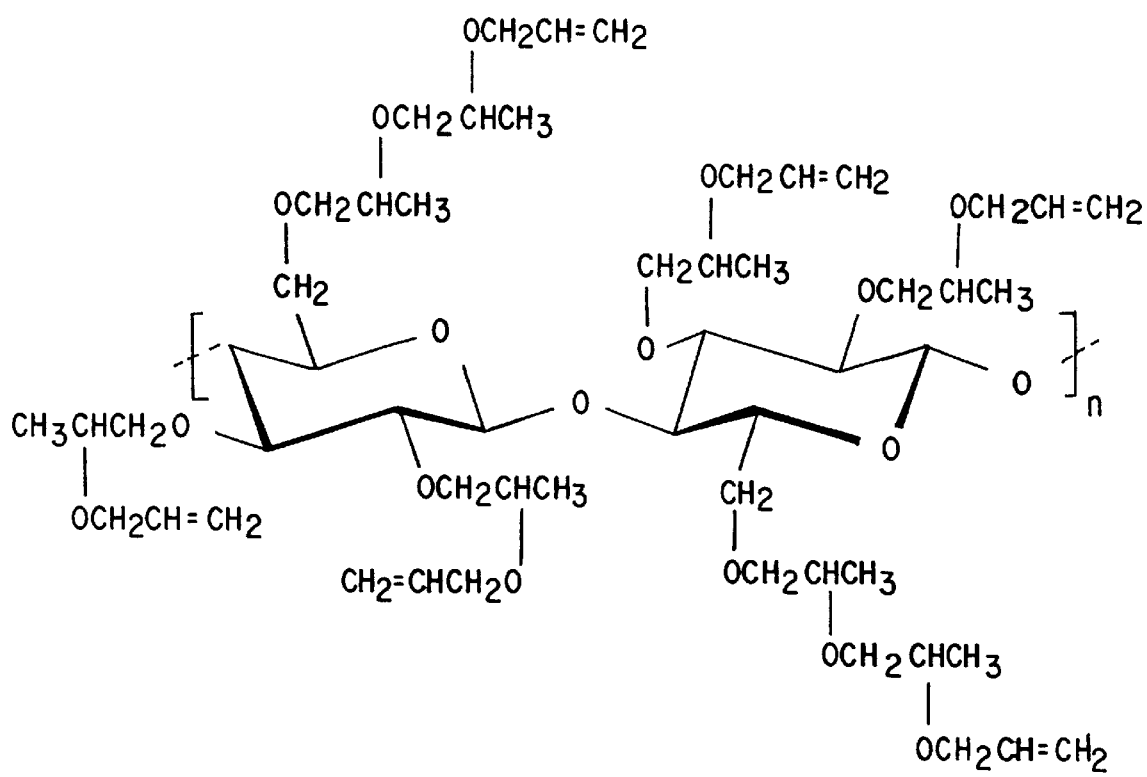
FIG. 4 shows the molecular structure of an allyl ether according to the present invention, obtained from the hydroxypropyl cellulose shown in FIG. 2.

O-(2-hydroxypropyl cellulose)-allyl ether, having the structural formula shown in FIG. 4, is an example of the cellulose (ether) ether of the present invention. This compound can be obtained by the following method.

Figure 2:
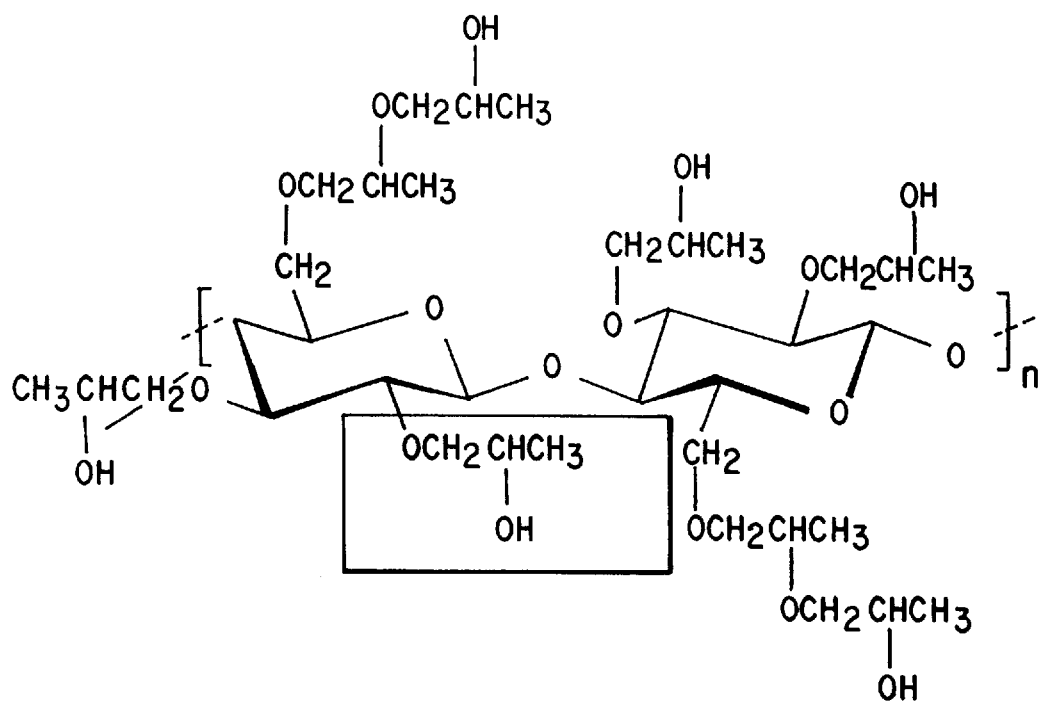
FIG. 2 shows the molecular structure of the cellulose ether hydroxypropyl cellulose, which can be used as an educt.

A solution of 11.2 g of potassium t-butanolate in 60 ml of t-butanol is added to a solution of 4 g of conventional, commercial O-hydroxypropyl cellulose, having the structural formula shown in FIG. 2, in a mixture of 70 ml of dimethyl sulfoxide and 30 ml of tetramethylurea. While cooling with water, 20 ml of allyl bromide is added over a period of 2 hours. After 12 hours of stirring, 10 ml of glacial acetic acid and 150 ml of water are added. The supernatant liquid is decanted from the precipitated product, and the precipitate is mixed with 100 ml of acetone and precipitated once again with 300 ml of water. This purification step is repeated twice more. The purified product is dried under vacuum. The yield is 3.5 g of a slightly yellowish, viscous polymer, which is soluble in acetone, toluene and chloroform.

A 25% solution in toluene of the polymer obtained by the method described above is prepared and mixed with 3% by weight (based on the weight of the polymer) of Darocur 4265, a photoinitiator from Ciba Geigy in Basel. Droplets of this solution are placed on glass. After evaporation of the solvent, the resulting films are heated at different temperatures for 15 minutes, wherein the treatment temperature determines the interferential color effect. The chiral-nematic phase, formed as a result of the heat treatment, is stabilized immediately thereafter, by cross-linking the film by exposure to UV light at the appropriate temperatures. The liquid crystalline polymer treated at three different temperatures and the interferential color effect achievable thereby are distinguished below by the wavelength of the reflected light.

| Treatment | Wavelength of the reflection |
|---|---|
| at 130° C.: | $\lambda_{max}$ = 450 nm, |
| at 145° C.: | $\lambda_{max}$ = 500 nm and |
| at 150° C.: | $\lambda_{max}$ = 550 nm. |

By merely varying the treatment temperature before the cross-linking of the polymer film, interference pigments of all colors of the spectrum can thus be produced from the same inventive liquid crystalline polymer. Mixed colors can be produced by mixing interference pigments of different color, wherein the different interference pigments can be mixed as loose particles to produce a paint from the pigment mixture. It is also possible to initially use a single color interference pigment to produce finished paints having the colors of the rainbow, from which mixed colors are generated by mixing the paints.

Figure 3:
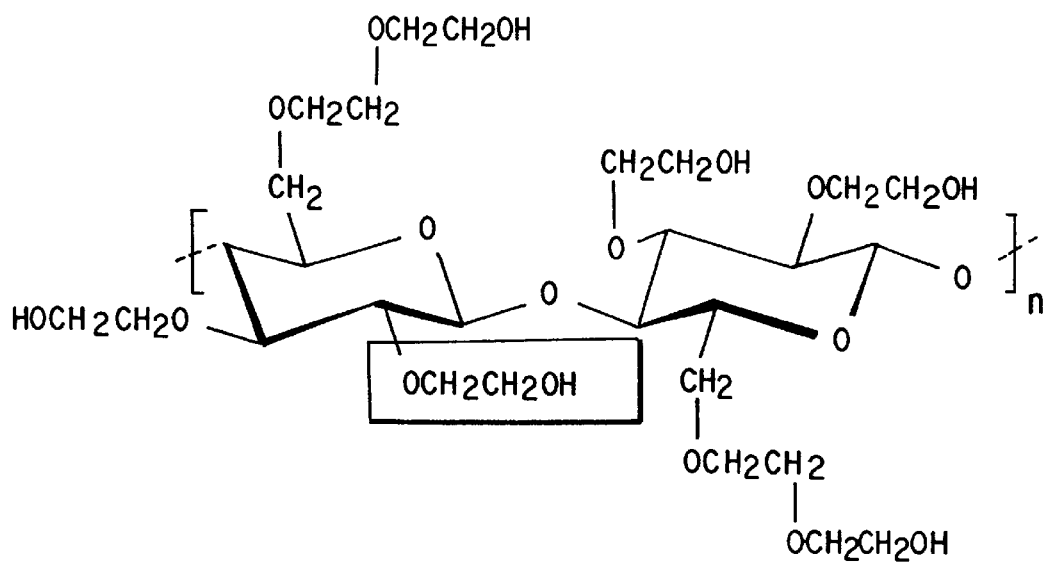
FIG. 3 shows the molecular structure of the cellulose ether hydroxyethyl cellulose, which can be used as an educt.
Figure 5:
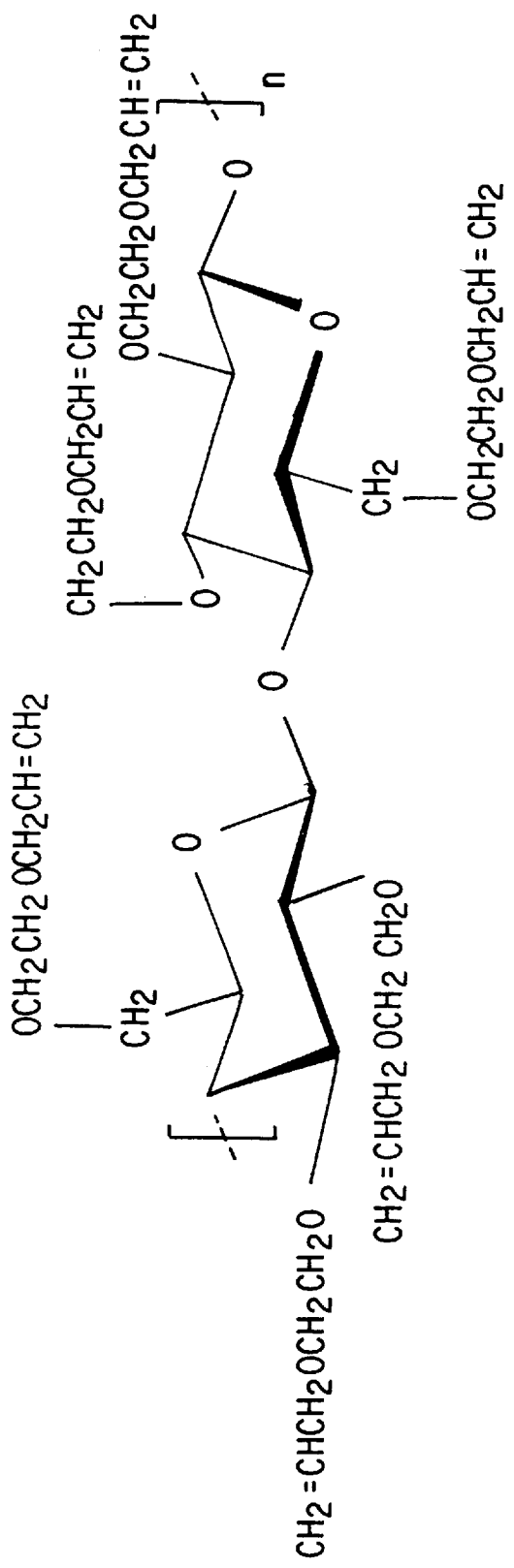
FIG. 5 shows the molecular structure of an allyl ether according to the present invention, obtained from the hydroxyethyl cellulose shown in FIG. 3.

A liquid crystalline polymer, such as an allyl ether of hydroxyethyl cellulose for example, the structural formula of which is given in FIG. 3, can also be synthesized in a similar manner from a commercially obtainable hydroxyethyl cellulose, the structure of which is given in FIG. 5.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A liquid crystalline, photo cross-linkable main-chain polymer which is an interferentially effective, chromophoric substance for colored paints, comprising main mesogenic groups disposed at least approximately in a chiral-nematic manner, wherein the polymer is an etherified cellulose ether or a mixture of several etherified cellulose ethers wherein:

the cellulose ether has a molecular weight of 500 to 1,000,000, the cellulose ether comprises anhydroglucose units which are etherified with an average degree of molar substitution of 2 to 7 with propylene oxide or ethylene oxide units ($C_3H_6O$- or $C_2H_4O$-units), and the cellulose ether is etherified with an average degree of molar substitution of 1.5 to 3 with unsaturated hydrocarbon groups ($C_rH_{2r-1}$).

2. The polymer of claim 1, wherein the cellulose ether is an educt containing side chains with 2 to 15 carbon atoms.

3. The polymer of claim 1, wherein the cellulose ether is additionally etherified with alkenyl groups.

4. The polymer of claim 1, wherein the etherified cellulose ether is a propylene oxide educt ($C_3H_6O$-units), wherein hydroxypropyl cellulose of the following general formula

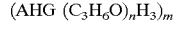

is etherified to a product of the following general formula

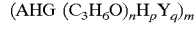

wherein AHG=anhydroglucose unit, $Y=C_rH_{2r-1}$, n=2 to 7, m=5 to 2500, p=3−q, q=1 to 3 and r=2 to 15.

5. The polymer of claim 1, wherein the etherified cellulose ether is an ethylene oxide educt ($C_2H_4O$-units), wherein hydroxyethyl cellulose of the following general formula

is etherified to a product of the following general formula $(AHG\ (C_2H_4O)_nH_pY_q)_m$ 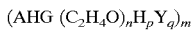

wherein AHG=anhydroglucose unit, $Y=C_rH_{2r-1}$, n=2 to 7, m=5 to 2500, p=3−q, q=1 to 3 and r=2 to 15.

6. An interference pigment or an interferential, color-effective, paint substance of liquid crystalline, cross-linked, main-chain polymers for colored paints, comprising main mesogenic groups disposed at least approximately in a chiral-nematic manner, wherein the polymer is an etherified cellulose ether or a mixture of several etherified cellulose ethers wherein:

the cellulose ether has a molecular weight of 500 to 1,000,000, the cellulose ether comprises anhydroglucose units which are etherified with an average degree of molar substitution of 2 to 7 with propylene oxide or ethylene oxide units ($C_3H_6O$- or $C_2H_4O$-units), the cellulose ether is etherified with an average molar degree of substitution of 1.5 to 3 with unsaturated hydrocarbon groups ($C_rH_{2r-1}$).

7. The interference pigment of claim 6, wherein the interference pigment has a thickness of 5 to 50 μm.

8. The interference pigment of claim 6, wherein the interference pigment has a diameter of 5 to 100 μm.

9. A method of producing platelet-shaped interference pigments comprising producing a film with an approximately chiral-nematic arrangement of molecules by applying liquid crystalline main-chain polymers (LCP) in the liquid state on a smooth substrate, curing the film, removing the film from the substrate, comminuting the film into platelet-shaped particles, and sorting the particles by a separation method based on size, wherein the film is produced from a liquid crystalline etherified cellulose ether or a mixture of different etherified cellulose ethers wherein:

the cellulose ether has a molecular weight of 500 to 1,000,000, the cellulose ether comprises anhydroglucose units which are etherified with an average degree of molar substitution of 2 to 7 with propylene oxide or ethylene oxide units ($C_3H_6O$- or $C_2H_4O$-units), the cellulose ether is etherified with an average molar degree of substitution of 1.5 to 3 with unsaturated hydrocarbon groups ($C_rH_{2r-1}$).

10. The method of claim 9, wherein the chiral-nematic arrangement of the molecules in the film has a helix pitch and an un-cross-linked interlattice plane distance which can be changed by tempering the film, comprising changing the interlattice plane distance to correspond to a wavelength of an interference color.

11. The method of claim 9, comprising tempering the film in the un-cross-linked state by heating at a constant temperature in the range of from 120° C. to 160° C. for a period of 5 to 30 minutes and subsequently cross-linking the liquid crystalline polymer by UV radiation.

12. The method of claim 11, comprising heating the film for 15 minutes.

13. An effect paint for painting an object, wherein the paint has a coloring effect which is produced by platelet-shaped interference pigments comprising cross-linked, liquid crystalline main-chain polymers (LCP), which are dispersed in the paint and which align themselves automatically approximately parallel to the surface of the object during application of the paint, wherein the polymers comprise main mesogenic groups disposed at least approximately in a chiral-nematic manner and wherein the polymer is an etherified cellulose ether or a mixture of several etherified cellulose ethers wherein:

the cellulose ether has a molecular weight of 500 to 1,000,000, the cellulose ether comprises anhydroglucose units which are etherified with an average degree of molar substitution of 2 to 7 with propylene oxide or ethylene oxide units ($C_3H_6O$- or $C_2H_4O$-units), the cellulose ether is etherified with an average molar degree of substitution of 1.5 to 3 with unsaturated hydrocarbon groups ($C_rH_{2r-1}$).

14. The effect paint of claim 13, wherein the interference pigment has a thickness of 5 to 50 μm.

15. The effect paint of claim 13, wherein the interference pigment has a diameter of 5 to 100 μm.

16. An effect paint for painting an object comprising a coloring effect attained by an interferential, chromophoric paint substance formed by a liquid crystalline photo cross-linkable main-chain polymer (LCP) or a mixture of such polymers, wherein main mesogenic groups are disposed at least approximately chirally-nematically during application of the paint, wherein the polymer is an etherified cellulose ether or a mixture of several etherified cellulose ethers wherein:

the cellulose ether has a molecular weight of 500 to 1,000,000, the cellulose ether comprises anhydroglucose units which are etherified with an average degree of molar substitution of 2 to 7 with propylene oxide or ethylene oxide units ($C_3H_6O$- or $C_2H_4O$-units), and the cellulose ether is etherified with an average degree of molar substitution of 1.5 to 3 with unsaturated hydrocarbon groups ($C_rH_{2r-1}$).

17. The effect paint of claim 16, wherein the cellulose ether is an educt containing side chains with 2 to 15 carbon atoms.

18. The effect paint of claim 16, wherein the cellulose ether is additionally etherified with alkenyl groups.

19. The effect paint of claim 16, wherein the etherified cellulose ether is a propylene oxide educt ($C_3H_6O$-units), wherein hydroxypropyl cellulose of the following general formula $(AHG\ (C_3H_6O)_nH_3)_m$ 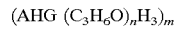

is etherified to a product of the following general formula $(AHG\ (C_3H_6O)_nH_pY_q)_m$ 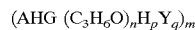

wherein AHG=anhydroglucose unit, $Y=C_rH_{2r-1}$, n=2 to 7, m=5 to 2500, p=3−q, q=1 to 3 and r=2 to 15.

20. The effect paint of claim 18, wherein the etherified cellulose ether is an ethylene oxide educt ($C_2H_4O$-units), wherein hydroxyethyl cellulose of the following general formula $(AHG\ (C_2H_4O)_nH_3)_m$ 

is etherified to a product of the following general formula $(AHG\ (C_2H_4O)_nH_pY_q)_m$ 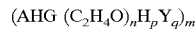

wherein AHG=anhydroglucose unit, $Y=C_rH_{2r-1}$, n=2 to 7, m=5 to 2500, p=3−q, q=1 to 3 and r=2 to 15.

21. An article coated with a paint comprising a coloring effect produced by platelet-shaped interference pigments from cross-linked liquid crystalline main-chain polymers (LCP), which are dispersed in the paint and which align themselves automatically approximately parallel to the surface of the object during application of the paint, wherein the polymers comprise main mesogenic groups disposed at least approximately in a chiral-nematic manner and wherein the polymer is an etherified cellulose ether or a mixture of several etherified cellulose ethers wherein:

the cellulose ether has a molecular weight of 500 to 1,000,000, the cellulose ether comprises anhydroglucose units which are etherified with an average degree of molar substitution of 2 to 7 with propylene oxide or ethylene oxide units ($C_3H_6O$- or $C_2H_4O$-units), the cellulose ether is etherified with an average molar degree of substitution of 1.5 to 3 with unsaturated hydrocarbon groups ($C_rH_{2r-1}$).

22. The article of claim 21, wherein the interference pigment has a thickness of 5 to 50 μm.

23. The article of claim 21, wherein the interference pigment has a diameter of 5 to 100 μm.

24. The article of claim 21 wherein the article is a vehicle body.

25. An article coated with a paint comprising a coloring effect attained by an interferentially chromophoric paint substance which is formed of a liquid crystalline photo cross-linkable main-chain polymer (LCP) or a mixture of such polymers, wherein main mesogenic groups are disposed at least approximately chirally-nematically during application of the paint wherein the polymer is an etherified cellulose ether or a mixture of several etherified cellulose ethers wherein:

the cellulose ether has a molecular weight of 500 to 1,000,000, the cellulose ether comprises anhydroglucose units which are etherified with an average degree of molar substitution of 2 to 7 with propylene oxide or ethylene oxide units ($C_3H_6O$- or $C_2H_4O$-units), and the cellulose ether is etherified with an average degree of molar substitution of 1.5 to 3 with unsaturated hydrocarbon groups ($C_rH_{2r-1}$).

26. The article of claim 25, wherein the cellulose ether is an educt containing side chains with 2 to 15 carbon atoms.

27. The article of claim 25, wherein the cellulose ether is additionally etherified with alkenyl groups.

28. The article of claim 25, wherein the etherified cellulose ether is a propylene oxide educt ($C_3H_6O$-units), wherein hydroxypropyl cellulose of the following general formula $$(AHG\ (C_3H_6O)_n H_3)_m$$

is etherified to a product of the following general formula $$(AHG\ (C_3H_6O)_n H_p Y_q)_m$$

wherein AHG=anhydroglucose unit, $Y=C_rH_{2r-1}$, n=2 to 7, m=5 to 2500, p=3−q, q=1 to 3 and r=2 to 15.

29. The article of claim 25, wherein the etherified cellulose ether is an ethylene oxide educt ($C_2H_4$-units), wherein the hydroxyethyl cellulose of the following general formula $$(AHG\ (C_3H_4O)_n H_3)_m$$

is etherified to a product of the following general formula $$(AHG\ (C_2H_4O)_n H_p Y_q)_m$$

wherein AHG=anhydroglucose unit, $Y=C_rH_{2r-1}$, n=2 to 7, m=5 to 2500, p=3−q, q=1 to 3 and r=2 to 15.

* * * * *